United States Patent
Oyagi et al.

(10) Patent No.: US 12,297,764 B1
(45) Date of Patent: May 13, 2025

(54) EXHAUST PURIFYING APPARATUS FOR INTERNAL COMBUSTION ENGINE

(71) Applicant: TOYOTA JIDOSHA KABUSHIKI KAISHA, Toyota (JP)

(72) Inventors: Hiroshi Oyagi, Kyoto (JP); Hirokazu Ito, Shizuoka-ken (JP); Kazuhiko Seguchi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/963,771

(22) Filed: Nov. 29, 2024

(30) Foreign Application Priority Data

Jan. 17, 2024 (JP) ................. 2024-005160

(51) Int. Cl.
*F01N 3/28* (2006.01)
*F01N 13/10* (2010.01)

(52) U.S. Cl.
CPC ........... *F01N 3/2892* (2013.01); *F01N 13/10* (2013.01); *F01N 2240/20* (2013.01)

(58) Field of Classification Search
CPC ...... F01N 13/10; F01N 13/08; F01N 2240/20; F01N 2490/08; F01N 2470/20; F01N 2490/18; F01N 2610/02; F01N 3/2066; F01N 3/28; F01N 3/2892
See application file for complete search history.

(56) References Cited

U.S. PATENT DOCUMENTS

2022/0274060 A1* 9/2022 Hamamoto .......... B01D 53/945
2022/0290598 A1* 9/2022 Kohberg ................. F01N 3/005

FOREIGN PATENT DOCUMENTS

| CN | 110735702 A | * | 1/2020 | ............. F01N 13/08 |
| CN | 110088442 B | * | 4/2021 | ............. B01D 53/94 |
| EP | 2823880 A1 | * | 1/2015 | .......... B01F 3/04049 |
| JP | 2006009793 A | | 1/2006 | |

* cited by examiner

*Primary Examiner* — Anthony Ayala Delgado

(57) ABSTRACT

An exhaust purifying apparatus includes an exhaust manifold, a cylindrical catalytic converter, and a cylindrical connection portion that connects the catalytic converter to the exhaust manifold. The exhaust manifold is connected to a side surface of the connection portion. The connection portion is connected to the catalytic converter so as to have the same central axis as the catalytic converter. The connection portion includes a constriction at a part connected to the catalytic converter. A part of the connection portion on an upstream side of the constriction defines a collision diffusion chamber. The cross-sectional flow area of the connection portion orthogonal to the central axis is smaller at the constriction than in the collision diffusion chamber. The constriction is not provided in a vertically lower part of the inner wall of the connection portion in a mounted state of the internal combustion engine.

4 Claims, 4 Drawing Sheets

EXHAUST PURIFYING APPARATUS FOR INTERNAL COMBUSTION ENGINE

CROSS-REFERENCE TO RELATED APPLICATIONS

This application is based upon and claims the benefit of priority from prior Japanese Patent Application No. 2024-005160, filed on Jan. 17, 2024, the entire contents of which are incorporated herein by reference.

BACKGROUND

1. Field

The present disclosure relates to an exhaust purifying apparatus for an internal combustion engine.

2. Description of Related Art

Japanese Laid-Open Patent Publication No. 2006-009793 discloses an exhaust pipe structure including a swirling flow generator disposed between an exhaust manifold and a catalytic converter. The swirling flow generator collects exhaust gas flowing through exhaust pipes of the exhaust manifold and converts the flow of the collected exhaust gas into a swirling flow. The swirling flow generator converts the flow of the exhaust gas into a swirling flow, thereby diffusing the flow of the exhaust gas flowing into the catalytic converter.

In the case of the exhaust pipe structure disclosed in Japanese Laid-Open Patent Publication No. 2006-009793, condensed water generated in the exhaust manifold flows into the swirling flow generator positioned below the exhaust manifold during engine operation. The outflow portion for guiding exhaust gas to the catalytic converter is connected to the swirling flow generator at a position above the lowermost portion of the swirling flow generator. Therefore, there is a concern that condensed water may accumulate in the swirling flow generator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an exhaust purifying apparatus for an internal combustion engine includes an exhaust manifold, a cylindrical catalytic converter, and a cylindrical connection portion that connects the catalytic converter to the exhaust manifold. The exhaust manifold is connected to a side surface of the connection portion. The connection portion is connected to the catalytic converter so as to have a same central axis as the catalytic converter. The connection portion includes a constriction at a part connected to the catalytic converter. The constriction is a part at which an inner wall of the connection portion bulges inward. A part of the connection portion on an upstream side of the constriction defines a collision diffusion chamber. The collision diffusion chamber is configured to cause exhaust gas flowing from the exhaust manifold to collide with an inner wall of the collision diffusion chamber, diffuse the exhaust gas, and guide the diffused exhaust gas to the catalytic converter. A cross-sectional flow area of the connection portion orthogonal to the central axis is smaller in the constriction than in the collision diffusion chamber. The constriction is not provided in a vertically lower part of the inner wall of the connection portion in a mounted state of the internal combustion engine.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
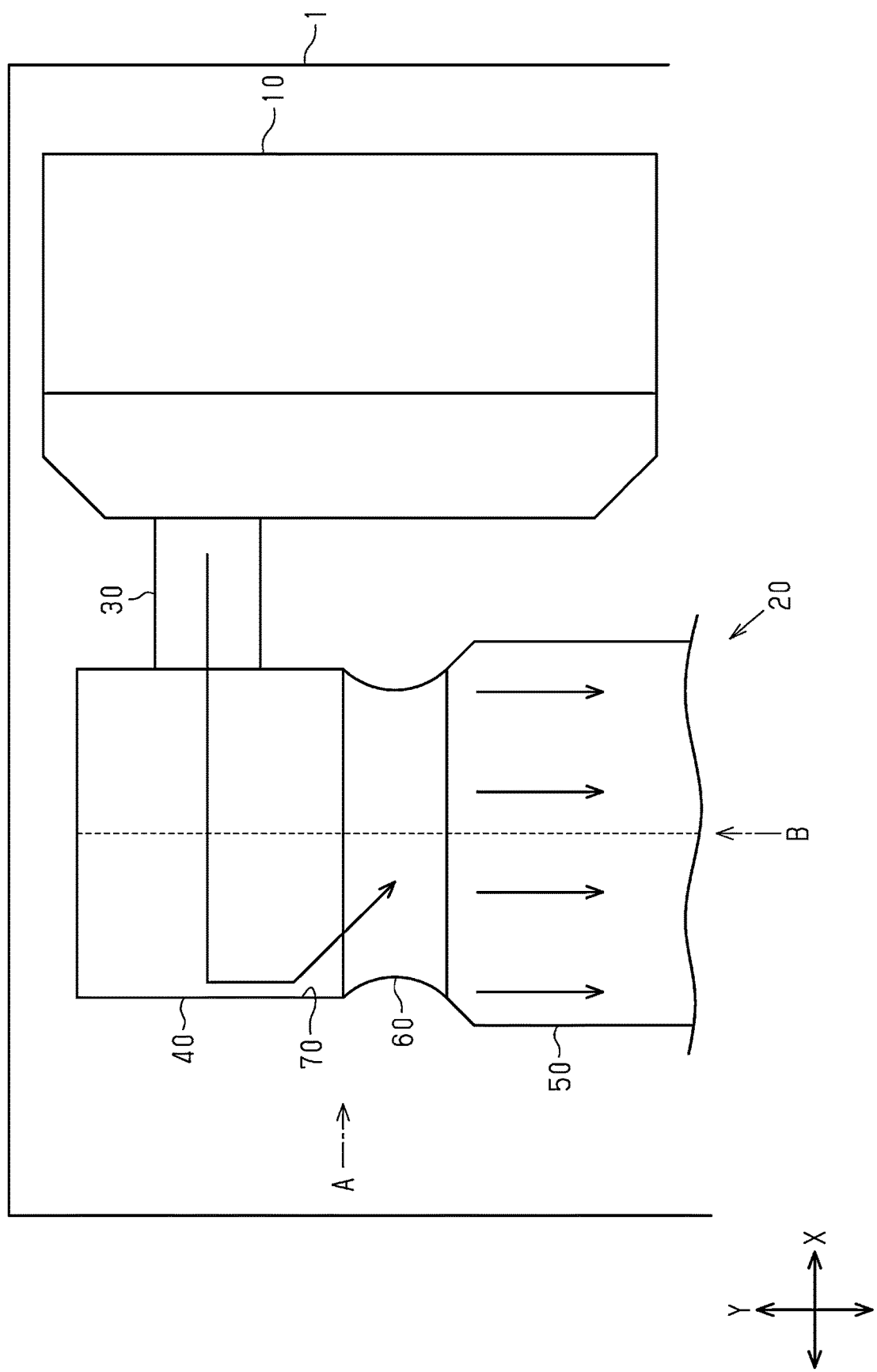
FIG. 1 is a top view of an exhaust purifying apparatus for an internal combustion engine according to an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of an exhaust purifying apparatus for an internal combustion engine will be described with reference to FIGS. 1 to 3.

In the drawings, the width direction of the exhaust purifying apparatus 20 of the internal combustion engine 10 is a direction along the X axis. The length direction of the exhaust purifying apparatus 20 orthogonal to the width direction is a direction along the Y axis. A height direction of the exhaust purifying apparatus 20 orthogonal to both the width direction and the length direction is a direction along the Z axis and is a vertical direction.

Configuration of Exhaust Purifying Apparatus 20

FIG. 1 schematically shows an exhaust purifying apparatus 20 of an internal combustion engine 10 mounted in a vehicle 1.

As shown in FIG. 1, the exhaust purifying apparatus 20 includes an exhaust manifold 30, a cylindrical connection portion 40, and a cylindrical catalytic converter 50.

The exhaust manifold 30 is configured to guide the exhaust gas generated in the internal combustion engine 10 to the catalytic converter 50. In FIG. 1, the flow of the exhaust gas guided by the exhaust manifold 30 is indicated by arrows.

The connection portion 40 is a cylindrical part that connects the exhaust manifold 30 and the catalytic converter 50. The connection portion 40 has the same central axis as the catalytic converter 50. The connection portion 40 is connected to the catalytic converter 50 at one end in the axial direction. The connection portion 40 is connected to the exhaust manifold 30 at its cylindrical side surface. At a part at which the connection portion 40 and the catalytic converter 50 are connected to each other, an inner wall of the connection portion 40 is raised inward to provide a constriction 60. A part of the connection portion 40 on the upstream side of the constriction 60 defines a collision diffusion chamber 70. The flow path of the exhaust gas in the connection portion 40 is narrower in a part corresponding to the constriction 60 than in a part corresponding to the collision diffusion chamber 70.

The collision diffusion chamber 70 is configured such that the exhaust gas flows into the collision diffusion chamber 70 through the exhaust manifold 30. The exhaust gas flowing into the collision diffusion chamber 70 collides with the inner wall of the collision diffusion chamber 70. The exhaust gas colliding with the inner wall of the collision diffusion chamber 70 diffuses in the collision diffusion chamber 70. The diffused exhaust gas flows into the catalytic converter 50 located downstream of the collision diffusion chamber 70. A part of the diffused exhaust gas flows along the inner wall of the collision diffusion chamber 70. At this time, the constriction 60 provided on the inner wall of the connection portion 40 changes the direction of the flow of the exhaust gas so that the flow of the exhaust gas is directed toward the center of the catalytic converter 50, whereby the exhaust gas flowing into the catalytic converter 50 is uniformly diffused.

The catalytic converter 50 is configured to purify harmful components contained in the exhaust gas. The harmful components contained in the exhaust gas include carbon monoxide, hydrocarbons, and/or nitrogen oxides. The exhaust gas purified in the catalytic converter 50 is discharged from an exhaust outlet 80 of the catalytic converter 50. The exhaust outlet 80 is shown in FIG. 3.

Figure 2:
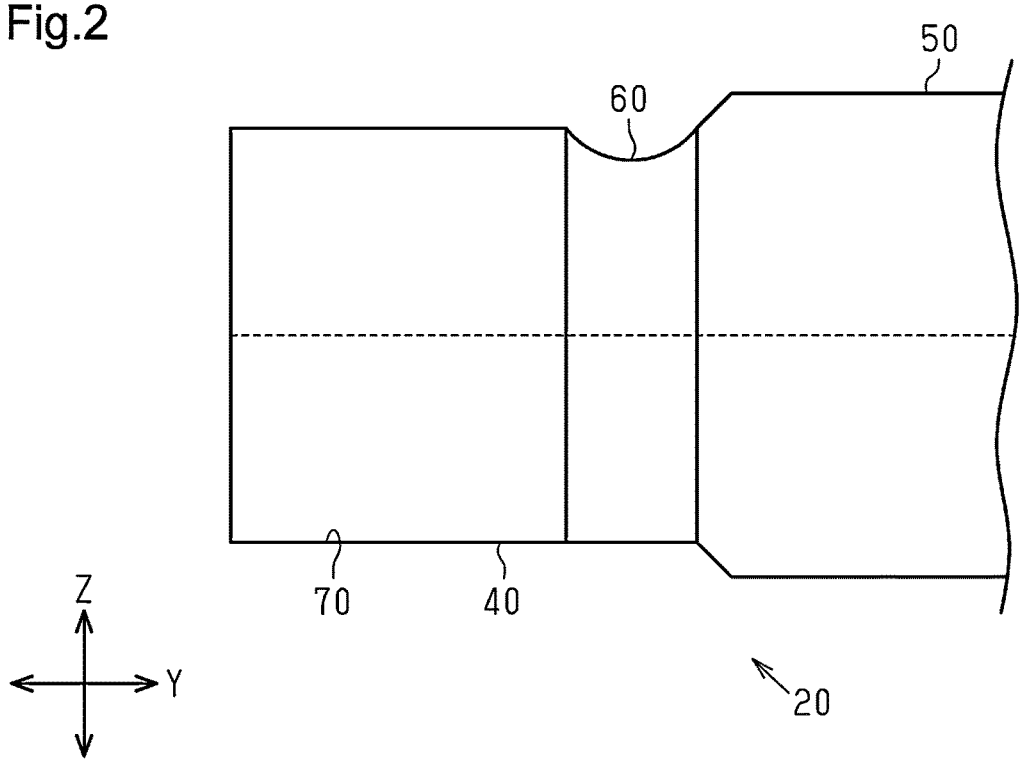
FIG. 2 is a side view of the exhaust purifying apparatus shown in FIG. 1, as seen from the direction of arrow A in FIG. 1.

FIG. 2 is a side view of the exhaust purifying apparatus 20 as seen from the direction of arrow A in FIG. 1. FIG. 3 is a front view of the exhaust purifying apparatus 20 as seen from the direction of arrow B in FIG. 1. As shown in FIGS. 2 and 3, the constriction 60 is not provided in a vertically lower part of the inner wall of the connection portion 40 in a mounted state of the internal combustion engine 10. The "mounted state of the internal combustion engine 10" means a state in which the internal combustion engine 10 is mounted on the vehicle 1. The "vertically lower part of the inner wall of the connection portion 40" is a part of the inner wall of the connection portion 40 in a predetermined range including at least the lowermost portion in the vertical direction.

Figure 3:
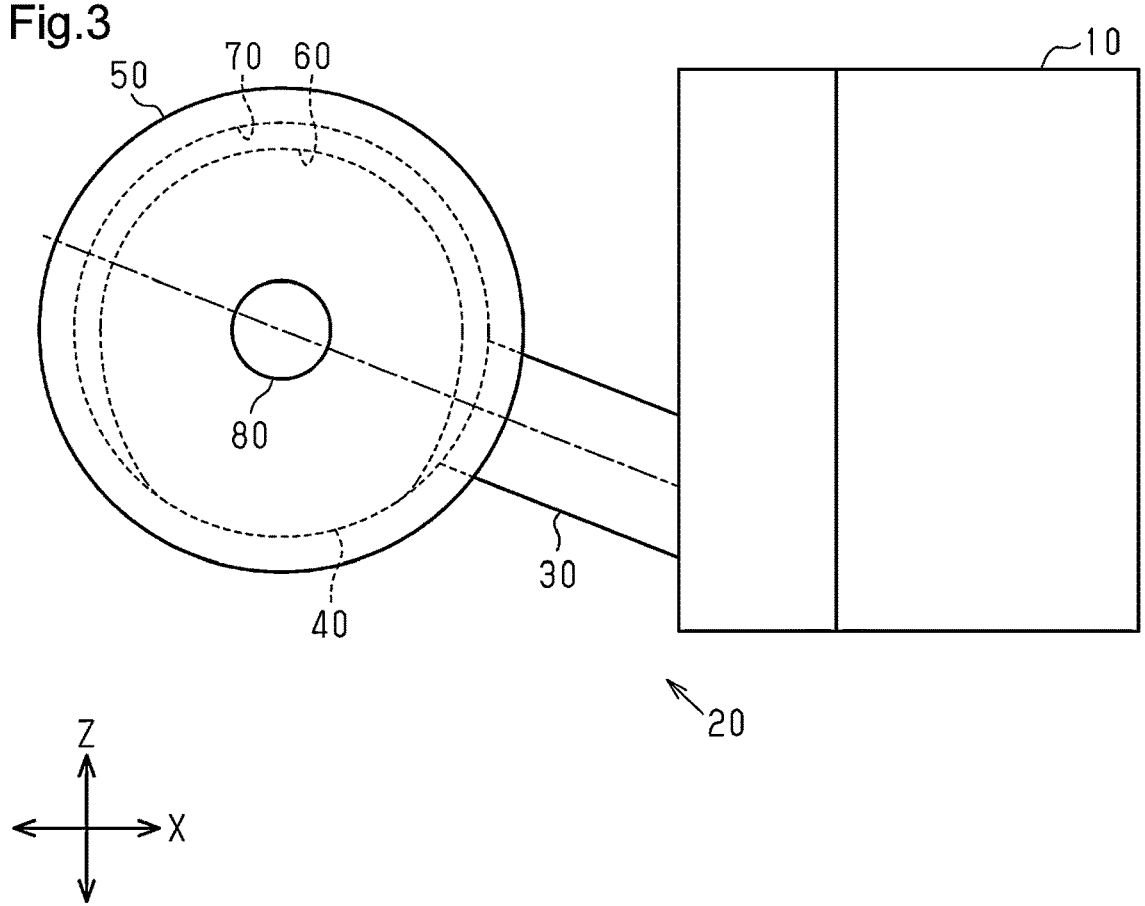
FIG. 3 is a front view of the exhaust purifying apparatus shown in FIG. 1, as seen from the direction of arrow B in FIG. 1.

In FIG. 3, an imaginary line obtained by extending the center line of an outlet of the exhaust manifold 30 is indicated by a long-dash short-dash line. As shown in FIG. 3, in the mounted state of the internal combustion engine 10, the outlet of the exhaust manifold 30 is opened in a lower part of the inner wall of the connection portion 40 in the vertical direction. The "lower part of the inner wall of the connection portion 40 in the vertical direction" is a lower half part of the inner wall of the connection portion 40 in the vertical direction. In other words, the "lower part of the inner wall of the connection portion 40 in the vertical direction" is a part of the inner wall of the connection portion 40 below a horizontal plane passing through the central axis of the connection portion 40. The outlet of the exhaust manifold 30 is directed obliquely upward.

The constriction 60 extends in the circumferential direction of the connection portion 40 except for a vertically lower part of the inner wall of the connection portion 40 in the mounted state of the internal combustion engine 10. The constriction 60 is provided at least at the same position in the circumferential direction of the inner wall of the connection portion 40 as the position at which the exhaust gas flowing into the collision diffusion chamber 70 along the long-dash short-dash line shown in FIG. 3 collides with the inner wall of the collision diffusion chamber 70.

Operation of Present Embodiment

Figure 4:
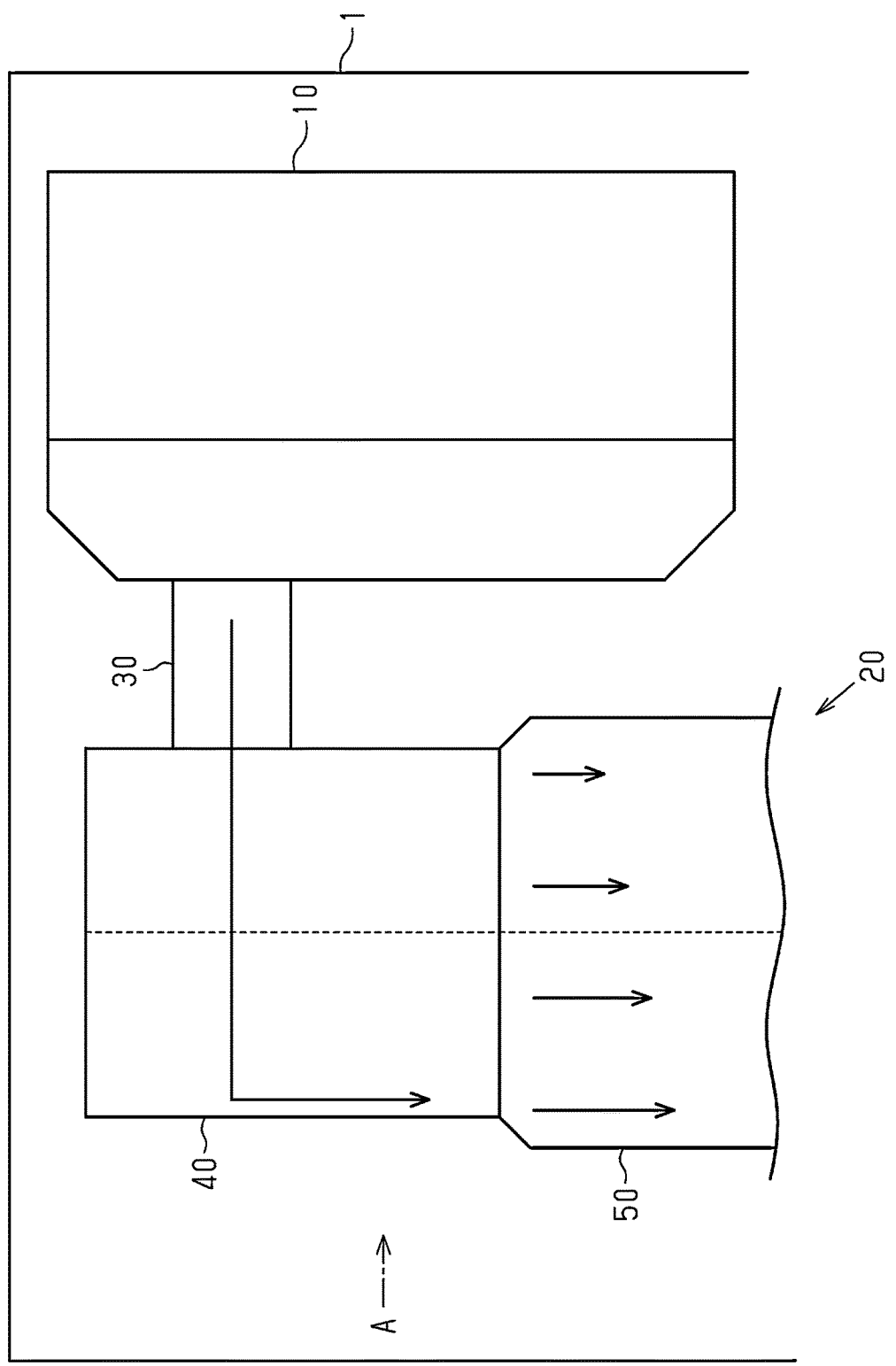
FIG. 4 is a top view of an exhaust purifying apparatus of an internal combustion engine of a first comparative example.
Figure 5:
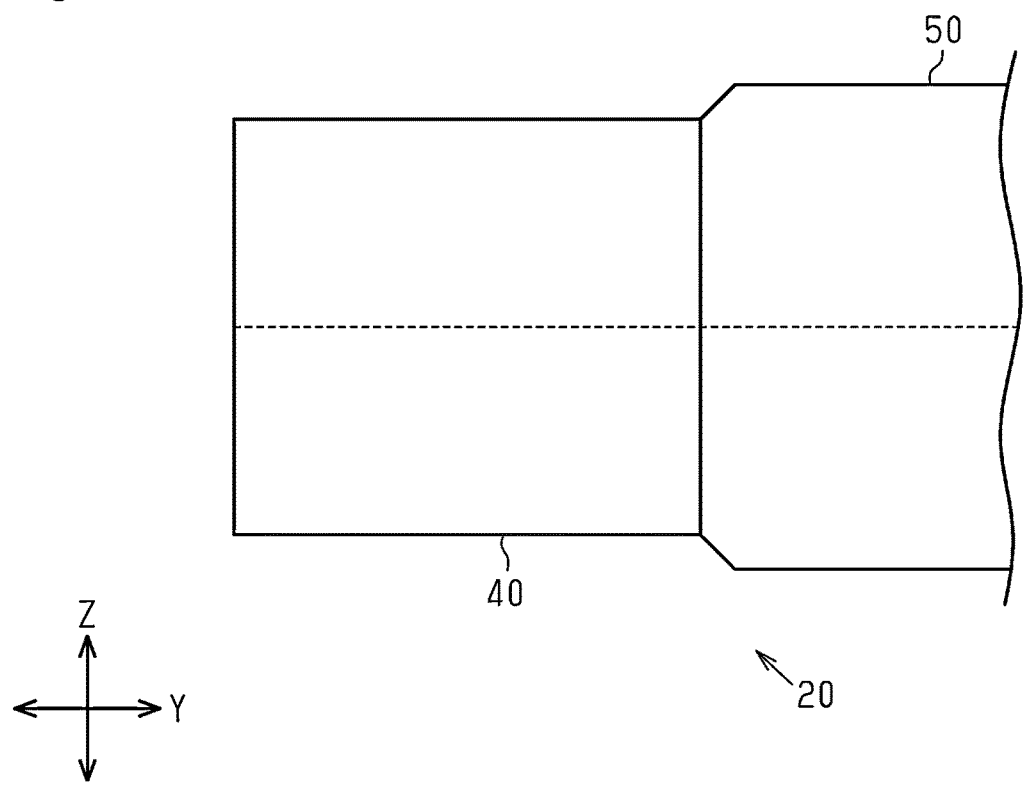
FIG. 5 is a side view of the exhaust purifying apparatus shown in FIG. 4, as seen from the direction of arrow A in FIG. 4.

As indicated by arrows in FIG. 1, the exhaust gas flowing from the exhaust manifold 30 collides with the inner wall of the collision diffusion chamber 70. The constriction 60 changes the direction of the flow of the exhaust gas, thereby uniformly diffusing the exhaust gas. FIGS. 4 and 5 show, as a first comparative example, an exhaust purifying apparatus 20 provided with a connection portion 40 that does not include the constriction 60. FIG. 5 is a side view of the exhaust purifying apparatus 20 of the first comparative example, as seen from the direction of arrow A in FIG. 4. As shown in FIGS. 4 and 5, in the exhaust purifying apparatus 20, in which the constriction 60 is not provided, the exhaust gas flowing into the connection portion 40 is guided to the catalytic converter 50 along the inner wall of the connection portion 40. At this time, since the exhaust gas is not sufficiently diffused, the exhaust gas reaches the catalytic converter 50 in a state in which the flow of the exhaust gas is not uniform. Therefore, the exhaust gas is not sufficiently purified by the catalytic converter 50.

In contrast, in the present embodiment, the diffusion of exhaust gas is promoted by providing the constriction 60 on the inner wall of the connection portion 40. This configuration ensures that exhaust gas reaches the catalytic converter 50 without uneven flow distribution.

Figure 6:
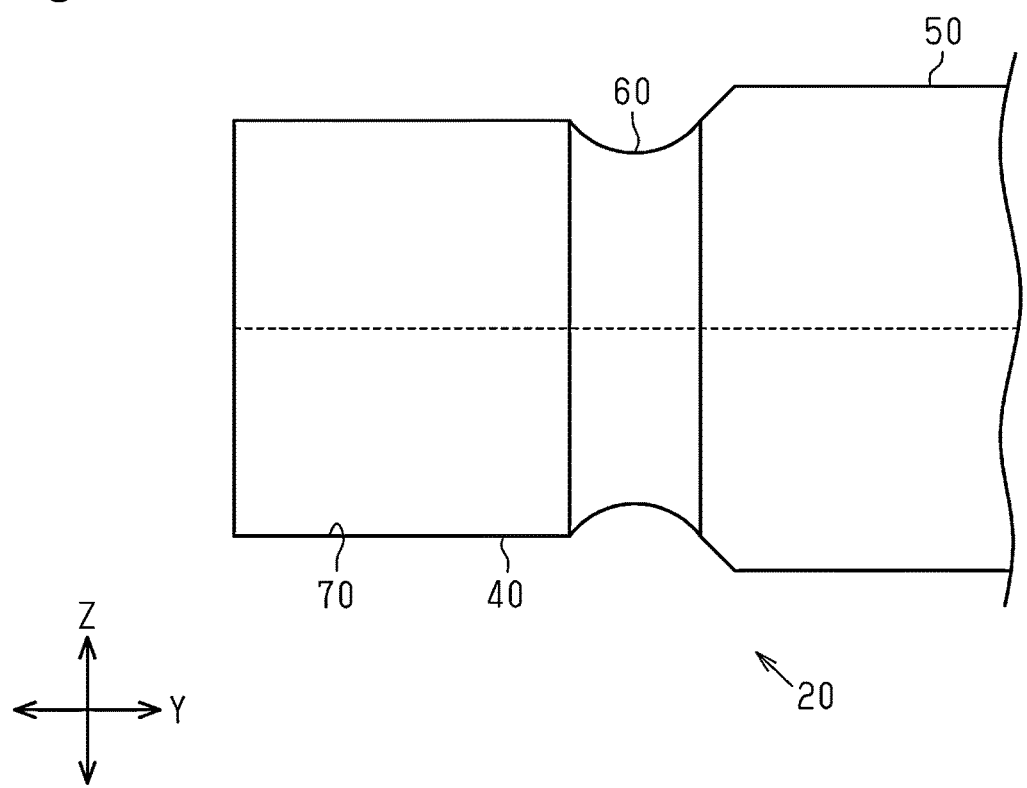
FIG. 6 is a side view of an exhaust purifying apparatus of an internal combustion engine of a second comparative example.

FIG. 6 shows, as a second comparative example, an exhaust purifying apparatus 20 in which the constriction 60 is provided along the entire circumference of the inner wall of the connection portion 40. FIG. 6 is a side view of the exhaust purifying apparatus 20 of the second comparative example, as seen from the direction of arrow A in FIG. 1.

Exhaust gas contains moisture. Therefore, in the exhaust purifying apparatus 20 of the second comparative example, there is a risk that condensed water may accumulate inside the collision diffusion chamber 70.

When the constriction 60 is provided over the entire circumference of the part of the inner wall of the connection portion 40 that is connected to the catalytic converter 50 as shown in FIG. 6, the condensed water in the collision diffusion chamber 70 is blocked by the constriction 60 and remains in the collision diffusion chamber 70.

In contrast, in the present embodiment, the constriction 60 is not provided in a vertically lower part of the inner wall of the connection portion 40 in the mounted state of the internal combustion engine 10. This configuration reduces the likelihood of condensed water accumulating within the collision diffusion chamber 70.

Advantages of the Present Embodiment (1) The exhaust purifying apparatus 20 can achieve both promotion of diffusion of the exhaust gas flowing into the catalytic converter 50 and suppression of accumulation of condensed water.
(2) The constriction 60 is provided on the inner wall of the connection portion 40 at the same position in the circumferential direction as the position at which the exhaust gas flowing from the exhaust manifold 30 collides with the inner wall of the collision diffusion chamber 70.

The exhaust gas flowing into the collision diffusion chamber 70 is guided to the catalytic converter 50 along the inner wall of the collision diffusion chamber 70. In the exhaust purifying apparatus 20 of the present embodiment, since the constriction 60 is provided at the same position in the circumferential direction as the position at which the exhaust gas collides with the inner wall of the collision diffusion chamber 70, the diffusion of the exhaust gas can be promoted.

(3) In the exhaust purifying apparatus 20 in which the constriction 60 is not provided in the vertically lower part of the inner wall of the connection portion 40, the exhaust gas is not sufficiently diffused is the exhaust gas is caused to flow in from the vertically upper part of the inner wall of the connection portion 40.

On the other hand, in the present embodiment, the outlet of the exhaust manifold 30 is opened in the lower part of the inner wall of the connection portion 40 in the vertical direction in the mounted state of the internal combustion engine 10. The outlet is directed obliquely upwards. Thus, the exhaust gas collides with the upper part of the inner wall of the collision diffusion chamber 70 in the vertical direction. Therefore, the exhaust gas can be diffused by the constriction 60.

Modifications

The above embodiment may be modified as described below. The present embodiment and the following modifications can be combined as long as the combined modifications remain technically consistent with each other.

Multiple constrictions 60 may be provided on the inner wall of the connection portion 40.

When the constriction 60 is provided in the connection portion 40, the concave portion may not be provided in the outer surface of the connection portion 40.

Although an example in which the diameter of the connection portion 40 is smaller than the diameter of the catalytic converter 50 is shown, the diameter of the catalytic converter 50 and the diameter of the connection portion 40 may be equal to each other.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An exhaust purifying apparatus for an internal combustion engine, comprising:
   an exhaust manifold;
   a cylindrical catalytic converter; and
   a cylindrical connection portion that connects the catalytic converter to the exhaust manifold, wherein
   the exhaust manifold is connected to a side surface of the connection portion,
   the connection portion is connected to the catalytic converter so as to have a same central axis as the catalytic converter,
   the connection portion includes a constriction at a part connected to the catalytic converter, the constriction being a part at which an inner wall of the connection portion bulges inward,
   a part of the connection portion on an upstream side of the constriction defines a collision diffusion chamber,
   the collision diffusion chamber is configured to cause exhaust gas flowing from the exhaust manifold to collide with an inner wall of the collision diffusion chamber, diffuse the exhaust gas, and guide the diffused exhaust gas to the catalytic converter,
   a cross-sectional flow area of the connection portion orthogonal to the central axis is smaller in the constriction than in the collision diffusion chamber, and
   the constriction is not provided in a vertically lower part of the inner wall of the connection portion in a mounted state of the internal combustion engine.

2. The exhaust purifying apparatus according to claim 1, wherein the constriction is provided at least at a same position in a circumferential direction as a position at which exhaust gas flowing from the exhaust manifold collides with the inner wall of the collision diffusion chamber.

3. The exhaust purifying apparatus according to claim 1, wherein
   the exhaust manifold includes an outlet connected to the collision diffusion chamber, and
   the outlet opens in a lower part of the inner wall of the connection portion in a vertical direction in the mounted state of the internal combustion engine.

4. The exhaust purifying apparatus according to claim 3, wherein the outlet of the exhaust manifold is directed obliquely upward.

* * * * *